United States Patent [19]

Gaslonde

[11] 4,450,392

[45] May 22, 1984

[54] ELECTRONIC SPEED REGULATOR FOR A D.C. MOTOR

[75] Inventor: Jean-Pierre Gaslonde, Caen, France

[73] Assignee: U.S. Philips Corporation, New York, N.Y.

[21] Appl. No.: 319,167

[22] Filed: Nov. 9, 1981

[30] Foreign Application Priority Data

Mar. 20, 1981 [FR] France .................... 81 05631

[51] Int. Cl.³ .............................................. G05B 5/00
[52] U.S. Cl. ................................... 318/317; 318/331;
318/334; 318/345 B; 318/345 F
[58] Field of Search ............... 318/301, 334, 331, 317,
318/345 B, 345 F; 307/297; 323/22 T

[56] References Cited

U.S. PATENT DOCUMENTS

| | | | |
|---|---|---|---|
| 3,705,337 | 12/1972 | Grabl | 318/331 |
| 4,163,182 | 7/1979 | Tanikoshi | 318/331 |
| 4,189,666 | 2/1980 | Tetsugu et al. | 318/331 X |
| 4,227,127 | 10/1980 | Fukaya et al. | 318/317 |
| 4,234,835 | 11/1980 | Ota et al. | 318/317 |
| 4,272,709 | 6/1981 | Mizumoto et al. | 318/317 |
| 4,345,189 | 8/1982 | Kukaya et al. | 318/317 |

*Primary Examiner*—Ulysses Weldon
*Attorney, Agent, or Firm*—Robert S. Smith

[57] ABSTRACT

An integrated circuit regulator in which current regulation is effected by means of a current mirror utilizing motor current as an input. The base currents of the transistors of this current mirror are supplied by a second current mirror whose operation depends on that of the first one. The device is used for speed control in battery-operated motors for record players and recorders.

4 Claims, 2 Drawing Figures

ELECTRONIC SPEED REGULATOR FOR A D.C. MOTOR

The present invention relates to an electronic speed regulator for a d.c. motor, which regulator is constructed as an integrated circuit having three terminals, that is, a first terminal to be connected to a first pole of a power supply and a second terminal to be connected to a second pole of the power supply via a resistor and a third terminal to be connected to one terminal of the motor. The other terminal of the motor is connected to the second pole. The integrated circuit comprises means enabling a substantially constant voltage to be maintained across the second and the third terminal regardless of the motor load, said means specifically comprising a voltage reference stage, an arrangement of two transistors of a first type, which are interconnected by their bases so as to form a first current mirror, of which transistors the first one is arranged between said first and third terminals and of which the second transistor, which supplies a current which is the image of that supplied by the preceding one, is arranged in series in a first circuit branch situated between the first and the second terminal, and a source which supplies a base current to said transistors.

It is to be noted that the technical term "Current mirror", which is generally used in the field of electronics, refers to an arrangement of at least two transistors which are interconnected by their bases and which supply two currents, one of which is a linear function of the other.

The invention more specifically, but not exclusively, relates to speed regulators for motors of tape recorders or record players, in which equipment the speed of the tape or the record should be very stable inspite of variations of the supply voltage, the ambient temperature or the resisting torque.

Electronic speed regulators as defined in the opening paragraph are known. As is known, said regulators are designed in such a way that the voltage across the motor increases or decreases as the current consumption increases or decreases, in order to compensate for variations in voltage loss associated with the armature resistance of the motor. In the descriptive part of the present Application the general operating principle of such a regulation will be outlines briefly and merely as an aid to memory, using algebraic formulas for a better understanding.

An example of a speed regulator for a d.c. motor of the type defined in the foregoing is described in German Patent Application No. 2,849,216.

In a first version of this regulator shown in FIG. 2 of the German Application, the source which supplies the base current to the transistors (11, ..., 14) of the current mirror comprises a transistor connected between ground (which corresponds to the first terminal mentioned in the opening paragraph of the present Application) and a terminal identified by the numeral 19 (second terminal in the present opening paragraph). A significant portion of the base current in conjunction with the current supplied by the transistor 11 of the mirror contributes to the control current which flows through the resistor 20. If the current supplied by the transistor 11 is always representative of a selected fraction of the current consumed by the motor 9 and thus constitutes a correct component of the control current, this is not so for the base current. Indeed, apart from being subject to the normal variations which follow those of the motor current the base current is subject to random variations in connection with variations in the gain of the transistors of the current mirror, which in turn depend on the value of the motor current and on variations in operating temperature. Therefore, the base current variations are the cause of the instability of the control current and give rise to uncontrolled variations in motor speed.

In a second version of the regulator shown in FIG. 4 of the German Patent Application No. 2,849,216, the base current supplied to the transistors of the current mirror is delivered by a transistor 36, which is arranged between terminals corresponding to the first and the third terminal of the device as defined in the opening paragraph of the present Application. The transistor 36 receives its control current from a current source 38 which is connected to the second terminal. Thus, the base current only contributes a negligible share $$\left( \frac{\text{base current}}{\text{gain of transistor 36}} \right)$$

to the current which flows through the current-sensing resistor and the regulation itself is effected correctly. Unfortunately, the difference between the supply voltage and the motor voltage (the latter being of the order of 4 volts), which is necessary for the correct operation of the regulator (voltage across the first and the third terminal), is substantial: it is substantially equal to the sum of the $VCE_{Sat}$ of the transistor supplying the base current and the VBE of the current mirror, that is 1.1 to 1.4 V in total.

In order to mitigate the drawbacks of each of the two arrangements proposed in the German Patent Application, it may be considered to provide a constant-current generator in the integrated circuit, which generator supplies the base current required by the transistors of the current mirror directly to these transistors. However, this generator would have to be capable of handling the large currents during starting of the motor and of permanently supplying a current of the order of ten times the base current during normal operation; this would lead to an excessive current consumption, because many phonographs and recorders are battery-powered and it is obviously necessary to ensure that the batteries can be used as long as possible, even when the supply voltage drops as they become exhausted. Therefore, steps must be taken to ensure that the current required for a correct regulation is low and that the excess voltage necessary for this regulation is so low that a maximum voltage remains available for the power supply of the motor.

It is the object of the invention to provide an electronic speed regulator for a d.c. motor which combines a satisfactory performance, a low operating voltage and a small operating current.

In accordance with the invention a regulator as defined in the opening paragraph of the present Application is characterized in that said source comprises a second arrangement of a third and a fourth transistor of a second type opposite to the first type, which transistors are interconnected by their bases and form a second current mirror, which third transistor is arranged in said first circuit branch in series between the second transistor and the second terminal, while the fourth transistor, which supplies a current which is the image of that from the third transistor, is arranged in a second circuit branch between the first and the second terminal, said second branch being further connected to the bases of the first and the second transistor.

Thus, in the first circuit branch a current $I_1$ flows, whose value is a constant fraction $n_1I$ ($n_1 < 1$) of the motor current I, $n_1$ being the characteristic coefficient or "transformation ratio" of the first current mirror. In the second circuit branch a current $I_2$ flows, which is in a linear relationship with $I_1$, a constant ratio $I_2 = n_2I_1$ ($n_2 \leq 1$ or $n_2 \geq 1$) being provided by the second current mirror ($n_2$: characteristic coefficient of the second mirror). Thus, at any instant the current $I_2 = n_1n_2I$ represents a well-defined fraction of the current I, regardless of the electrical (I varies with the motor load) and physical operating conditions (temperature of the transistors varies with I) of the device.

It is to be noted that the current $I_2$ is independent of the variation of the gain factors of the transistors of the current mirrors, which is essential, because said current $I_2$ contributes partly to the control current $I_R$ (which current flows in the current-sensing resistor which is connected to the second terminal of the circuit) and thus contributes to said regulation.

The coefficients $n_1$ and $n_2$ are chosen in such a way that the current $I_2$, from which the base current of the transistors of the first current mirror is derived, is at least equal to $I/\beta$ which defines the base current as a function of the motor current, $\beta$ being the gain of the transistors constituting the first current mirror. In practice $I_2$ is made greater than $I/\beta$ so as to avoid a partial failure of the regulation system.

In order to obtain the base current for the transistors of the first current mirror the second branch should be connected to the bases of the transistors of said mirror via a fifth transistor of the first type arranged in series with the fourth transistor between said transistor and the first terminal.

Moreover, a diode poled in the forward direction is arranged in parallel with the collector-emitter circuit of the fifth transistor. Via this diode the excess current formed by the difference between the current $I_2$ and the base current of the transistors of the first current mirror can be drained to the power supply.

In accordance with a further characteristic feature of the regulator in accordance with the invention a sixth transistor of the first type, whose base-emitter circuit is connected parallel and in the same sense to that one of the first and second transistors, which supplies an other current which is the image of that supplied by the first transistor, is connected to the junction point of two further transistors arranged at a differential stage, one of said last-mentioned transistors (the seventh transistor) being connected to the bases of the third and the fourth transistor with a main electrode and its base, while the other or eigth transistor is connected to said second terminal with a main electrode and to a junction point between the second and the third transistor with its base.

This combination of the sixth transistor and the differential stage serves a dual purpose. It enables the bases of the transistors of the second current mirror to be supplied with current. Furthermore, it ensures that the potential of said bases and the potential between the second and the third transistor are fixed, in order to preclude oscillations of the device.

The current $I_3$, which flows in the sixth transistor and which is the sum of the currents flowing in the seventh and the eighth transistor, is also a linear fraction of the motor current I. Said current $I_3$ flows in the current-sensing resistor and forms a further component of the total control current $I_R$.

Thus, the control current $I_R$ is mainly the sum of three currents $I_1$, $I_2$, $I_3$, which are all proportional or substantially proportional to the motor current I. This always guarantees a correct regulation.

Furthermore, the transistor (fifth transistor) which energizes the bases of the transistors of the first current mirror is not connected to the third terminal, as is the case in FIG. 4 of the previously considered German Application. Moreover, the potential difference between the first and the third terminal of the circuit, which corresponds to the supply voltage in excess of the motor voltage and which is required for the correct operation of the regulator, is limited to $VCE_{Sat}$ (0.3 to 0.5 V) of the current-mirror transistors that is to the absolute minimum.

Finally, the device in accordance with the invention has the advantage of performing correctly, even if the voltage reserved for regulation only drops to half a volt. This is a particularly favorable feature, because in the case of battery operation it permits an optimum use of said batteries.

The construction, operation and advantages of the electronic regulator in accordance with the invention will be more fully understood by means of the following description with reference to the accompanying drawings.

Figure 1:
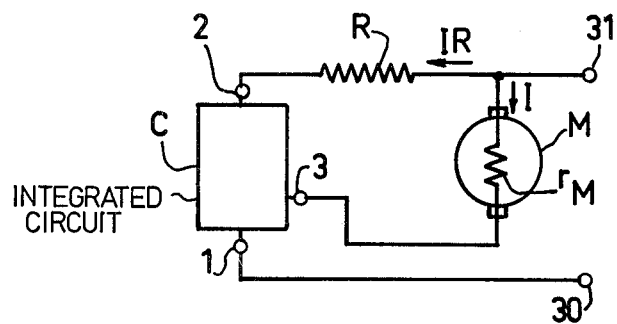
FIG. 1 is a typical circuit diagram, given by way of illustration, showing the basic construction of an electronic speed regulator.

For the sake of clarity the principle on which the operation of the known electronic speed regulator and, in particular, the regulator in accordance with the present invention is based is described first of all. For this, reference is made to FIG. 1.

Regulation is effected by means of an integrated circuit C in conjunction with a resistor R. The integrated circuit C comprises three terminals, of which a first terminal 1 is connected to a first pole 30 of a d.c. power supply. A second terminal 2 is connected to the second pole 31 of said d.c. power supply via the resistor R. The motor M is connected between the second pole and the third terminal 3. The resistor $r_M$ shown inside the motor M represents the overall internal resistance of the motor. The integrated circuit C comprises means which enable a substantially constant voltage to be maintained across its second and third terminals 2 and 3. The parameters are designated as follows:

V is the voltage between terminals 2 and 3,
$V_M$ is the voltage across the motor M,
$E_M$ is the back-EMF of the motor M,
I is the current flowing through the motor M,
$I_R$ is the control current, which flows through the resistor R.

On the one hand:

$$V_M = V + RI_R \qquad (1)$$

On the other hand:

$$V_M = E_M + r_M I \qquad (2)$$

Equalizing equations (1) and (2) yields:

$$V + RI_R = E_M + r_M I \qquad (3)$$

The purpose of the regulation is to maintain the motor speed constant; this means that $E_M$ is constant. In order to comply with equation (3), it is necessary that $$RI_R = r_M I \qquad (4)$$

If by suitable means it is ensured that $I_R$ is at any instant a fraction $I/K$ of I, equation (4) may be written as $$R(I/K) = r_M I \qquad (5)$$

It follows from equation (5) that, in order to obtain the desired speed regulation, it is necessary that $R = Kr_M$.

It is evident that the regulation problem resides mainly in maintaining a perfect proportionality between the control current $I_R$ and the motor current I, regardless of variations of I.

Figure 2:
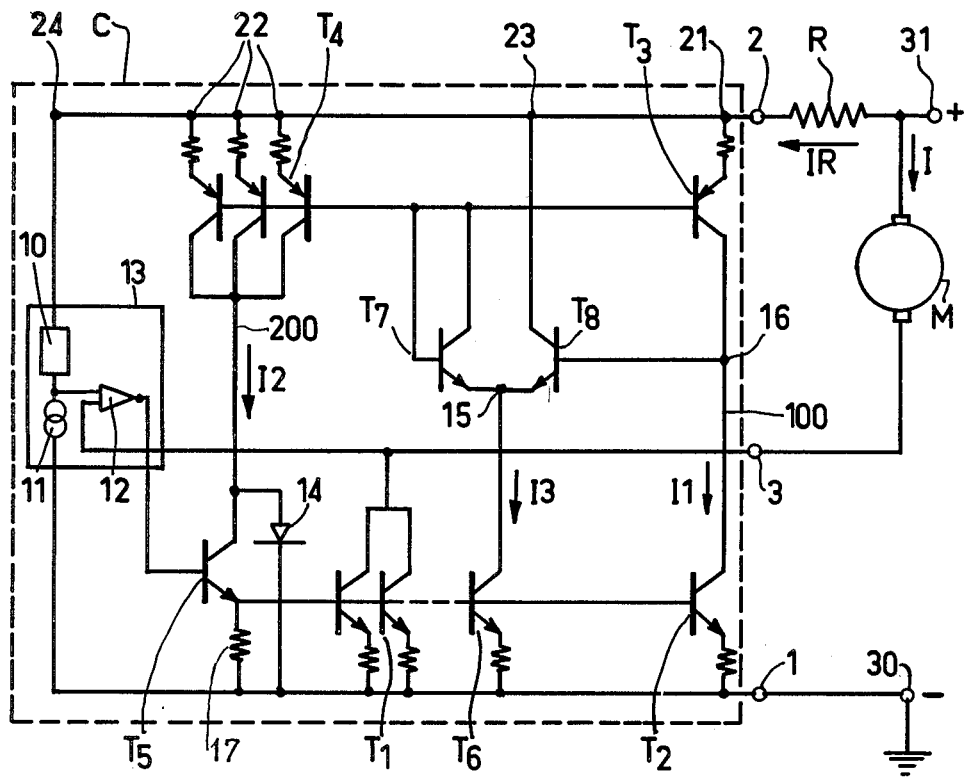
FIG. 2 shows the detailed circuit diagram of the integrated circuit used in the regulator in accordance with the invention.

Referring now to FIG. 2, current mirrors are shown. It is known that the ratios of the currents flowing through two or more transistors arranged as current mirrors correspond to the respective surface areas of their emitter regions. In practice, said transistors are constructed as identical basic transistors, a specific number of which are arranged in each branch of the mirror in order to obtain the desired current ratios. Such an arrangement is represented in FIG. 2. Moreover, it is known that in each emitter branch of a basic transistor a resistor of low value is included for stabilizing the respective gain factors of the transistors; this resistor, which is shown in the diagram, bears no reference numeral.

FIG. 2 again contains the three elements of the diagram of FIG. 1, namely the motor M, the resistor R, and the integrated circuit (contained within the dashed rectangle marked C) having the connection terminals 1, 2 and 3. The connections between the elements are also the same as in FIG. 1. In the present case the power-supply pole 31 is the positive pole, terminal 1 being connected to earth (pole 30).

The integrated circuit C comprises known parts which are characteristics of prior-art embodiments. These are:

a voltage reference stage 10, which is connected to terminal 2 and to a current source 11, which is connected to terminal 1. In FIG. 2 the stage 10 together with the current source 11 and a differential amplifier 12 can be found in a rectangle 13. This arrangement as well as its operation are described in the Applicant's French Patent Application no. 2,318,457 filed on July 16, 1975. a combination of two NPN-type transistors $T_1$ and $T_2$ which are interconnected by their bases and which constitute a first current mirror. Transistor $T_1$ is formed by a plurality of identical basic transistors (two of such transistors being shown) and is connected to terminal 3 with its collector and to terminal 1 with its emitter (via the basic resistors). Transistor $T_1$ is consequently arranged in series with the motor M between the poles 30 and 31; as a result of this, the total motor current I flows through said transistor.

Transistor $T_2$, arranged in series in a first circuit branch 100 between the terminals 1 and 2, is connected to terminal 1 by its emitter. In the collector-emitter circuit of transistor $T_2$ a current $I_1 = n_1 I$ flows which is an image and a fraction ($n_1 < 1$) of the current I flowing in transistor $T_1$ and which forms part of the control current $I_R$ flowing through the resistor R.

In accordance with further prior-art arrangements (see said French Application) terminal 3 is connected to an input terminal of the differential amplifier 12, the other terminal of said amplifier being connected to the voltage reference stage 10.

For the correct operation of said first current mirror a base current should be supplied to the transistors of the mirror.

In accordance with the invention, as defined in the foregoing, the source which supplies the base current comprises a second arrangement of a third and a fourth transistor, $T_3$ and $T_4$ respectively, of a type (PNP in the present case) opposite to that (NPN) of the transistors $T_1$ and $T_2$, which transistors are interconnected by their bases and constitute a second current mirror, the third transistor $T_3$ is arranged in said first circuit branch 100 in series between the second transistor $T_2$ and the second terminal 2, while the fourth transistor $T_4$, which supplies a current which is the image of that from the third transistor $T_3$, is arranged in the second circuit branch 200 situated between the first and the second terminal 1 and 2, said second branch 200 being further connected to the bases of the first and the second transistor. Said connection is established "via a fifth transistor $T_5$ of the first type (here NPN) arranged in series with the fourth transistor $T_4$ between this transistor and the first terminal 1".

In FIG. 2 this means that, in the branch 100, the transistor $T_3$ is connected to the collector of transistor $T_2$ with its collector and to terminal 2 with its emitter via a resistor of low value; and, in the branch 200, that transistor $T_4$ (here represented by three transistors arranged in parallel, said three transistors being fully identical to transistor $T_3$) is connected to terminal 2 with its emitter and to the collector of transistor $T_5$ with its collector, the emitter of the transistor $T_5$ being connected to terminal 1 via a resistor 17, and that moreover the emitter of transistor $T_5$ is connected to the bases of the transistors of the first current mirror.

Furthermore, the base of transistor $T_5$ is connected to the output of the amplifier 12, to provide its base current.

A diode 14 (which may be constituted by two or more diodes in series) poles in the forward direction, is connected in parallel with the collector-emitter circuit of transistor $T_5$. The diode fixes the collector potential of $T_4$ and $T_5$ and allows the difference between the base current required for the first current mirror and the current $I_2$ supplied by the transistor $T_4$ to be drained to terminal 1.

In accordance with an additional characteristic feature of the regulator in accordance with the invention "a sixth transistor $T_6$ of the first type (here NPN), whose base-emitter circuit is connected parallel and in the same sense to that one of the first and the second the transistor $T_1$ and $T_2$, which supplies an other current which is the image of that from the first transistor $T_1$, is connected to the junction point 15 (in the present case between the emitters) of two further transistors which are arranged as a differential stage, one of said last-mentioned transistors (the seventh transistor $T_7$) being connected to the bases of the third and the fourth transistors $T_3$ and $T_4$ with one main electrode (in the present case the collector) and its base, while the other or eighth transistor $T_8$ is connected to the second terminal 2 with a main electrode (here the collector) and to a junction point 16 of the second and the third transistor (here between the collectors of $T_2$ and $T_3$) with its base".

The base-emitter circuit of the transistors $T_3$ and $T_4$ of the second current mirror is thus connected to the power supply (via transistors $T_7$ and $T_6$). On the other hand, the potential on point 16 is fixed, which prevents the occurrence of undesired oscillations.

Since transistor $T_6$ belongs to the first current mirror the current $I_3$ which flows in this transistor is a linear function of the current I flowing in transistor $T_1$. The current $I_3$ is the sum of the currents flowing in the transistors $T_7$ and $T_8$, the current through $T_7$ represents the sum of the base currents of transistors $T_3$ and $T_4$ of the second current mirror. Thus, the entire current $I_3$ flows to terminal 2 and is a component of the control current $I_R$.

The control current $I_R$ applied to terminal 2 of the integrated circuit is divided into three main components which, starting from points 21, 22 and 23, follow three parallel branches. The component which flows from point 24 into the arrangement represented by the block 13 and which is very small relative to the other three components is ignored.

Of said respective main components:
the first one (point 21) substantially corresponds to the current $I_1 = n_1 I$ flowing through transistor $T_2$ of the first current mirror.

the second one (point 22) to a current $I_2 = n_2 I_1 = n_1 n_2 I$ flowing through transistor $T_4$ of the second current mirror.

the third one (point 23) to a current $I_3 = n_1 I$ flowing to transistor $T_6$ of the first current mirror.

Since each of the components, $I_1$, $I_2$ and $I_3$ is proportional to the motor current I, the control current: $I_R = I_1 + I_2 + I_3 = n_1 I + n_1 n_2 I + n_1 I = I(2n_1 + n_1 n_2)$ itself is proportional I.

In the evaluation of each of said components of the current $I_R$ no allowance has been made for additive or subtractive factors of comparatively little significance, which are mainly attributable to the values of the base currents. For example, the current which is derived from $I_R$ from point 23 is not absolutely equal to $I_3 = n_1 I$ flowing through $T_6$; in fact, the current flowing through $T_7$ should be subtracted from $I_3$, which current in turn is the sum of the base currents of $T_3$ and $T_4$. On the other hand, it is to be noted that the base current of $T_3$ would have to be added to that taken as the component $I_1$; similarly, the base current of $T_4$ would have to be added to the component $I_2$. All in all, a compensation is obtained which ensures that $I_R$ is proportional to I although the components $I_1$, $I_2$ and $I_3$ individually are not strictly proportional.

From FIG. 2 and the foregoing analysis, it follows that:
the current $I_2$ from which the base current of the transistors $T_1$, $T_2$, $T_6$ of the first current mirror is derived is strictly proportional ($I_2 = n_1 n_2 I$) to the motor current I, regardless of the variable gain of said transistors. Thus it produces no impermissible random variation of the control current $I_R$.

the difference between the supply voltage and the motor voltage, required for a correct operation of the regulator is very small. This part of the supply voltage corresponds to the voltage across terminals 1 and 3 (supply voltage = voltage across terminals 31 and 3 of the motor + voltage across the terminals 1 and 3); it may decrease to $VCE_{Sat}$ of transistor $T_1$ of the current mirror, that is 0.3 to 0.5 V. To the Applicant's knowledge the prior-art speed regulators of the same type as that in accordance with the invention do not combine these characteristic features and advantages.

It is evident that modifications can be made to parts of the regulator other than those which are specific of the invention—modifications to the parts bounded by the rectangle 13, for example—without departing from the scope of the invention.

Within the scope of the invention variants are also possible with respect to the actual device in accordance with the invention, for example depending on its use or the manufacturing method. For example, the values of the coefficients $n_1$ and $n_2$ may vary, specifically as a function of the gain factors of the transistors used; from the difference in size of the transistors $T_3$ and $T_4$ as shown in FIG. 2 it might be deduced that $I_2$ is substantially larger than $I_1$; this is merely an example and the reverse would also be possible.

What is claimed is:
1. An electronic speed regulator, for controlling an associated d.c. motor having first and second connection points, which comprises:
a power supply having first and second poles; a resistor; an integrated circuit having first, second and third terminals, said first terminal of said integrated circuit being connected to said first pole of said power supply, said second terminal of said integrated circuit being connected to said second pole of said power supply via said resistor, and said third terminal of said integrated circuit being connected to said first connection point of said motor;

said second connection point of said motor being connected to said second pole of said power supply, said integrated circuit comprising means enabling a substantially constant voltage to be maintained across said second and third terminals thereof regardless of the load on the motor, said means comprising a voltage reference stage, an arrangement of first and second transistors of a first type which are interconnected by their bases to form a first current mirror, said first transistor being arranged between said first and third terminals, said second transistor supplying a current which is the image of that supplied by said first transistor and is arranged in series in a first circuit branch situated between said first and second terminals of said integrated circuit, and a source which supplies a base current to said first and second transistors, said source comprising an arrangement of third and fourth transistors of a second type opposite to said first type, said third and fourth transistors being interconnected by their bases to form a second current mirror, said third transistor being arranged in said first circuit branch in series between said second transistor and said second terminal of said integrated circuit, said fourth transistor, which supplies a current which is the image of that from said third transistor, being arranged in a second circuit branch between said first and said second terminals of said integrated circuit, said second branch being further connected to the bases of said first and said second transistors, said means including means for comparing the voltage between the second and third terminals with a reference voltage from said voltage reference stage and controlling in response thereto the voltage on the base terminals of the first and second transistors to maintain the voltage between the second and third terminals.

2. A regulator as claimed in claim 1 further including a fifth transistor of said first type, said second branch being connected to the bases of said transistors of said first current mirror via said fifth transistor arranged in series with said fourth transistor between said fourth transistor and said first terminal of said integrated circuit.

3. A regulator as claimed in claim 2 further including a diode, said diode being poled in the forward direction and is arranged in parallel with the collector-emitter circuit of said fifth transistor.

4. A regulator as claimed in claim 1, 2, or 3 further including a sixth transistor of said first type, said sixth transistor having a base-emitter circuit which is connected in parallel and in the same sense to the base emitter circuit of said first and second transistors and which supplies another current which is the image of that supplied by said first transistor and is connected to the junction point of two additional transistors arranged as a differential stage, one of said two additional transistors being connected to the bases of said third and fourth transistors with a main electrode and its base, while the other of the additional transistors being connected to said second terminal with a main electrode and to a junction point between said second and third transistors.

* * * * *